United States Patent
Udupa et al.

(10) Patent No.: US 8,375,364 B2
(45) Date of Patent: Feb. 12, 2013

(54) SIZE AND EFFORT ESTIMATION IN TESTING APPLICATIONS

(75) Inventors: Raghavendra Udupa, Bangalore (IN); Shishank Gupta, Bangalore (IN); Archana Rudra, Bangalore (IN)

(73) Assignee: Infosys Limited, Bangalore (IN)

(*) Notice: Subject to any disclaimer, the term of this patent is extended or adjusted under 35 U.S.C. 154(b) by 1451 days.

(21) Appl. No.: 11/871,093

(22) Filed: Oct. 11, 2007

(65) Prior Publication Data
US 2008/0092120 A1    Apr. 17, 2008

(51) Int. Cl.
G06F 9/44 (2006.01)
(52) U.S. Cl. ......... 717/124; 717/126; 714/38; 714/38.1; 714/38.14
(58) Field of Classification Search ............. 717/126, 717/124; 714/38, E11.028, 38.14
See application file for complete search history.

(56) References Cited

U.S. PATENT DOCUMENTS

| | | | |
|---|---|---|---|
| 5,781,720 A * | 7/1998 | Parker et al. ............... | 714/38.11 |
| 7,350,185 B2 * | 3/2008 | Sparago et al. ............. | 717/101 |
| 7,752,055 B1 * | 7/2010 | Partezana ..................... | 705/1.1 |
| 8,230,385 B2 * | 7/2012 | Meyer .......................... | 717/101 |
| 2005/0144529 A1 * | 6/2005 | Gotz et al. .................... | 714/38 |
| 2005/0172269 A1 * | 8/2005 | Johnson et al. .............. | 717/124 |
| 2007/0088986 A1 * | 4/2007 | Stark et al. ................... | 714/32 |
| 2007/0174702 A1 * | 7/2007 | Meyer .......................... | 714/33 |
| 2009/0006152 A1 * | 1/2009 | Timmerman et al. ......... | 705/7 |

OTHER PUBLICATIONS

Nageswaran, "Test Effort Estimation Using Use Case Points", Jun. 2001.*
Idri et al., "Estimating Software Project Effort by Analogy Based on Linguistic Values", 2002.*
Shepperd et al., "Estimating Software Project Effort Using Analogies", Nov. 1997.*
Mizuno et al., "On Estimating Testing Effort Needed to Assure Field Quality in Software Development", 2002.*
Gupta, "Parametric Test Optimization," $3^{rd}$ International Software Testing Conference, India, 10 pages, 2001.

* cited by examiner

Primary Examiner — Phillip H Nguyen
(74) Attorney, Agent, or Firm — Klarquist Sparkman, LLP

(57) ABSTRACT

Size of a software application testing project is determined, and person/hours required for the testing project is estimated. The software application is sized by counting the number of different parameter types that occur within testing activities associated with the application. The parameter type numbers are then divided by a scaling weight to arrive at a Testing Unit number, which is then divided by a Testing Unit rate, e.g., person hours associated with each testing unit, to arrive at an estimated testing project effort. Some embodiments include an uncertainty calculation that potentially increases testing time based on clarity of the project requirements, the tester familiarity with the application area and the tester familiarity with the domain. Some embodiments calculate separate testing project times for different phases of the testing project.

16 Claims, 16 Drawing Sheets

| PARAMETER SCALING WEIGHTS | |
|---|---|
| # of Steps per Testing Unit (TU) 410 | 5 |
| Test Data per TU 415 | 0.5 |
| Validation Checks per TU 420 | 1 |
| Front-End Validation Checks per TU 425 | 2.5 |
| Arithmetic Validations per TU 430 | 0.5 |
| Database Validations per TU 435 | 0.25 |
| Bitmap Validations per TU 440 | 0.5 |
| External Interface Validations per TU 445 | 0.5 |

FIG. 7

| TEST CASES 720 | # OF STEPS | # OF DATA CREATION/ MANIPULATION STATEMENTS | # OF FRONT END VALIDATIONS | # OF ARITHMETIC VALIDATIONS | # OF VALIDATIONS AGAINST DATABASE | RAW TESTING UNITS |
|---|---|---|---|---|---|---|
| 101 | 10 | 5 | 1 | 1 | 5 | 35 |
| 102 | 550 | 44 | 20 | 16 | 25 | 39 |
| | | | | | | |
| | | | | | | |
| | | | | | | |
| | | | | | | |

| COMPLEXITY ADJUSTMENT FACTORS | | | |
|---|---|---|---|
| ADJ. PARAMETER  910 | VALUE 950 | CONT. 960 | WEIGHT 970 |
| CLARITY OF REQ.  920 | 0<br>1<br>2 | 0<br>0.05<br>0.1 | |
| PRIOR APPLICATION KNOWLEDGE 930 | 0<br>1 | 0<br>0.1 | |
| DOMAIN COMPLEXITY  940 | 0<br>1<br>2 | 0<br>0.05<br>0.1 | |

FIG. 11

| TEST CASES 1120 | CLARITY REQUIREMENT 1125 | PRIOR APPLICATION KNOWLEDGE 1130 | DOMAIN COMPLEXITY 1135 | ADJUSTMENT FACTOR 1140 | ADJUSTED TESTING UNITS 1145 |
|---|---|---|---|---|---|
| 101 | 2 | 1 | 2 | 1.3 | 45 |
| 102 | 2 | 0 | 1 | 1.05 | 355 |
| | | | | | |
| | | | | | |
| | | | | TOTAL 1150 | 400 |

1100

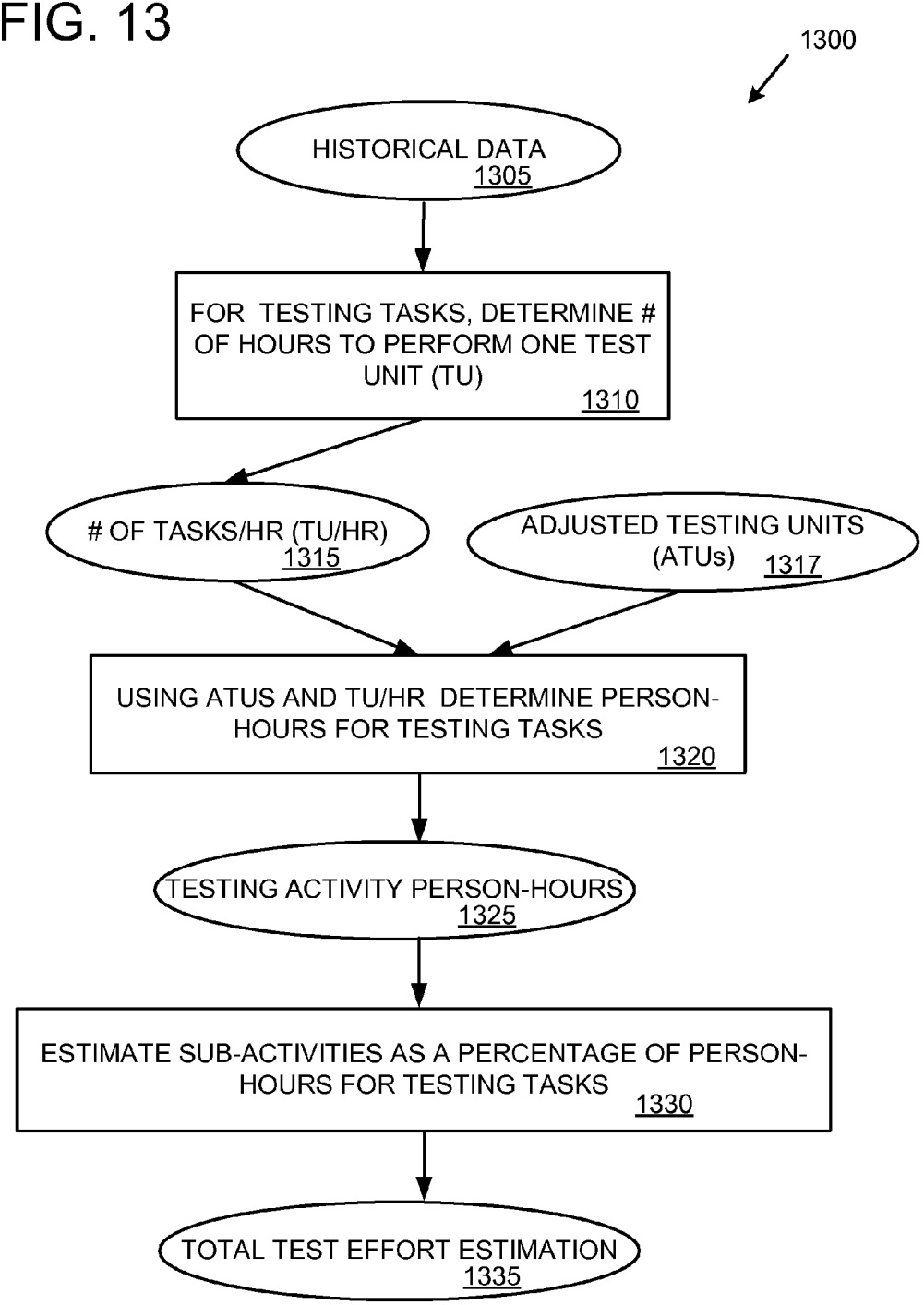

FIG. 14

1400

| Sub Activity Effort |||||
|---|---|---|---|---|
| Sub Activities || Recommended Values || Hrs |
| Requirement Analysis (RA) Review 1405 |||||
| Test Case Generation (TCG) | 1410 ||| 28 |
|    RTM Preparation | 1415 | 10% of TCG time (optional) |||
|    RTM Review & Rework | 1420 | 7.5% of TCG time (optional) |||
|    Test Case Review | 1425 | 15% of TCG time |||
|    Test Case Rework | 1430 | 20% of TCG time |||
|    Test Environment Setup | 1435 | 5% of TCG time |||
|    Test Data Setup | 1440 | 5% of TCG time |||
| Manual Test Execution (MTE) | 1445 ||| 41 |
|    Cycle 1 Retest Effort | 1450 | Uses anticipated test case failure percentage. || 8 |
|    Manual Test Execution (MTE) Effort in Cycle 2 (Regression Cycle) | 1455 | Uses anticipated test case regression percentage || 24 |
|    Test Result Analysis | 1460 | 10% of MTE time |||
|    Test Result Reporting | 1465 | 5% of MTE time |||
|  |||||
| TOTAL EFFORT TCG/MTE | 1470 ||| 101 |
| TOTAL EFFORT with Subactivites 1475 |||||
| Project Management Activity | 1480 | 10 % of TCG/MTE |||
|  |||||
| Total Testing Effort | 1485 ||| 101 |

SOFTWARE FOR ESTIMATING SIZE AND
EFFORT REQUIRED FOR TESTING
APPLICATION(S) 1680

SIZE AND EFFORT ESTIMATION IN TESTING APPLICATIONS

COPYRIGHT AUTHORIZATION

A portion of the disclosure of this patent document contains material which is subject to copyright protection. The copyright owner has no objection to the facsimile reproduction by any one of the patent disclosure, as it appears in the United States Patent and Trademark Office patent files or records, but otherwise reserves all copyright rights whatsoever.

BACKGROUND

Accurately estimating the size of a testing project can be a difficult task. An inability to accurately estimate testing project size can result in significant time and cost overruns during software project testing. These problems are multiplied when trying to estimate the size of a testing project from scratch, that is, when the entity doing the testing is different than the entity that developed the software project initially. The ability to accurately estimate the size of, and thus the time required for, a testing project can be essential to the project's success.

There are a number of solutions for estimating software size with regards to testing. For example, function points can be used to measure the size of a software application, with the size then directly correlated with software testing time. However, testing requirements depend on features not adequately captured by looking at size. Such methodologies can be ineffective in accurately sizing software package implementation projects.

Sizing a software package implementation project can also be difficult due to the wide variety of activities involved. For example, implementing a software package can involve activities such as discovery, gap analysis, installation, configuration, testing, training, and deployment.

Specifically with software testing in mind, testing projects often estimate the size of the project in terms of number of test cases. The test cases are then divided into Simple, Medium, and Complex (SMC) test cases. The effort associated with each type is multiplied with the number of each and a buffer is added to arrive at the total testing project effort size. However, the number of test cases is not be a good indicator of the size of the project. Further, each project may have a varying definition of which test cases fall into each of the three categories. Moreover, the average amount of time required for each of the three cases is a subjective number that is often decided by individual project managers assigning numbers based on past experience.

SUMMARY

The following Detailed Description presents methods and apparatus for estimation of the size of a software testing project and the effort that will be required to appropriately perform the tests.

In an embodiment, a set of testing parameters is identified. Then, for a software application that is to be tested, the number of occurrences of those parameters (e.g., parameter size) is determined using resource requirements documents and other available documentation. The parameters comprise such features as number of testing steps, amount of test data needed, number of validation checks, and so forth. The parameter sizes are then multiplied by predetermined scaling weights. This translates the parameter sizes into test units (TUs). The TUs are then divided by a test unit/hr value (the TU rate) that converts the TUs into person-hours, e.g., the amount of effort needed to test the software application.

In some embodiments, uncertainty based on such features as clarity of the requirements, familiarity with the application area and familiarity with the domain (e.g., telecom, banking, hospital, etc.) is factored into the calculation, and can modify the estimate.

In some embodiments, separate time estimation values are given for different testing phases. For example, test case generation (TCG) and manual test execution (MTE) may have different testing times determined. Subactivity effort associated with the testing phases and calculated as percentages of the determined testing times (e.g., 10% of the TCG) can be used to arrive at a total testing effort estimation.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

BRIEF DESCRIPTION OF THE DRAWINGS

FIG. 7 illustrates an input screen that may be used to input parameter scaling weights that may be used to determine raw testing units.

FIG. 9 is a block diagram of complexity adjustment factors that may be used with complexity adjustment factors to calculate adjusted testing units.

FIG. 11 illustrates an input screen that may be used to input adjustment factors that may be used to determine adjusted testing units.

FIG. 13 is a flowchart of an exemplary method that may be used to calculate a total test effort estimation using TU/hr and adjusted testing units.

FIG. 14 illustrates an input screen that may be used to display test effort estimation results.

DETAILED DESCRIPTION

Figure 1:
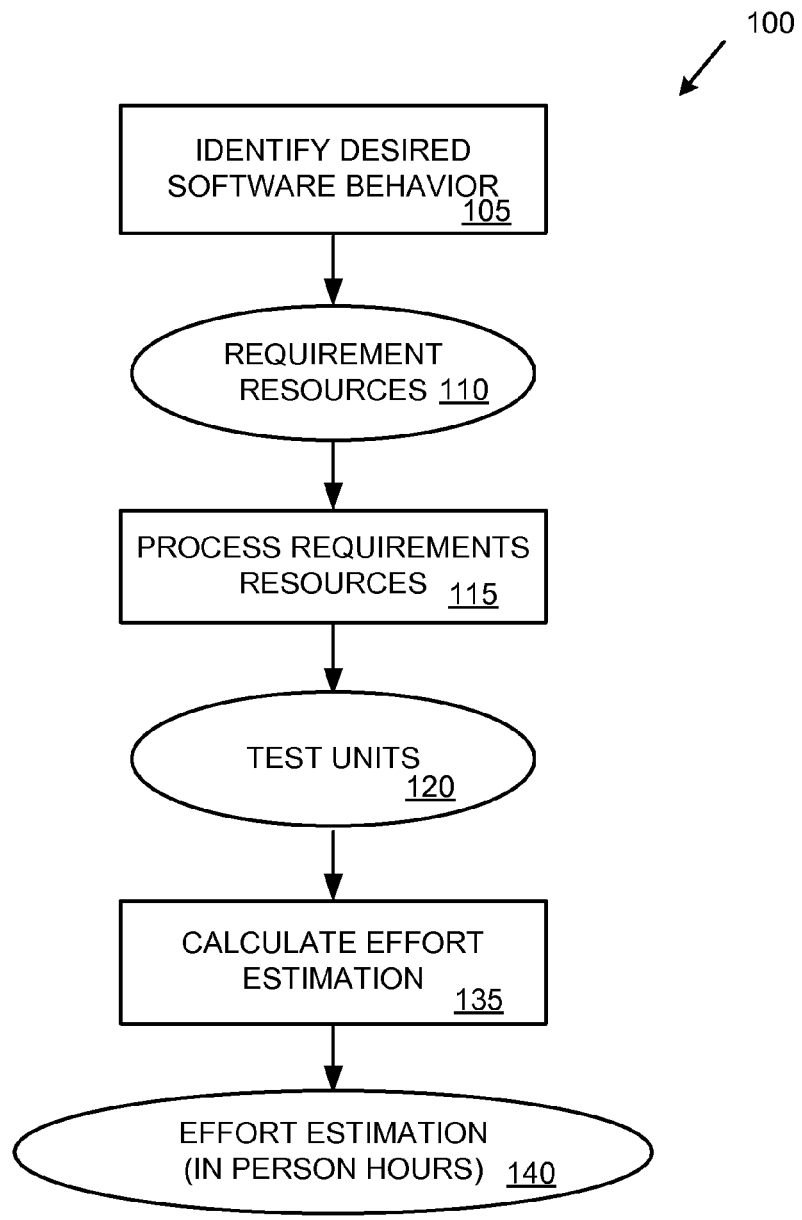
FIG. 1 is a flow chart of an exemplary method for estimating size when testing a software application.

Manual functional testing projects are carried out in multiple phases including a requirements study, Test Case Generation (TCG) which includes test planning, and Manual Test Execution (MTE). Estimation of the size of the testing project typically will occur at every phase of the life cycle as more requirements are identified. Hence, the size of life cycle activities such as TCG and MTE are typically critical. TCG refers to developing Test Cases (TCs) and MTE refers to execution of those TCs that are written during TCG. MTE may also include execution of other TCs provided by another group such as a client or vendor for the testing team. Aspects of the present technique are applicable to TCG, MTE, combinations thereof, and other testing phases.

EXAMPLE 1

Exemplary Testing Project

In any of the examples herein, a testing project can involve testing one or more software applications or components thereof. A software package can also be a component of a software application. A software package can include one or more modules. A testing project can involve testing one or more modules, one or more software packages, and/or one or more software applications.

A testing project can also involve testing a portion of a software application. Such testing projects can be part of a 'beginning to end' software development project, with the testing as one of the final steps. The testing project can also be an independent testing project, undertaken without previous knowledge of the underlying processes. For example, in an independent testing project, a testing team may not have information about the size of the development effort of the original software development project. Further, aspects of the present technique may be applicable to manual functional testing projects, or portions thereof.

Estimation of the size of the testing project may occur during any phase. In independent testing projects, where not much is known initially about a testing system, size estimation may occur before or after each testing phase, as more information is understood about the system under test.

EXAMPLE 2

Exemplary Manual Functional Testing Project

In any of the examples herein, a manual functional testing project may be carried out in multiple phases. These phases include, but are not limited to: requirements study, test planning, Test Case Generation (TCG), and Manual Test Execution (MTE). During MTE, cases that are written during the TCG are executed. The MTE may also include execution of other test cases provided by another group such as a client or vendor for the testing team. Test Case Generation time can be estimated separately from Manual Test Execution time.

The size of the application is estimated from a test perspective. The known requirements are turned into parameters which are then processed to produce test units, a standard unit of measurement of the size of a testing project. The known requirements are derived from various sources, e.g., documents, user information, legacy documentation, legacy test cases, and so forth. The more detailed the requirement documents available, the better the estimate that will be generated.

As more is learned about the application to be tested, the accuracy of the estimate can increase, and revised estimated can be produced.

EXAMPLE 3

Exemplary Test Units

In any of the examples herein, a Test Unit (TU) can be used to measure the size of a testing project. For a given number of test units in an application, corresponding time and resources are used to test the project. To determine how much time is associated with a test unit, completed projects (such as historical projects) can be sized in terms of test units. Then, project testing times can be correlated with the test unit.

The size of the testing project is further used to estimate the testing effort or the effort required for carrying out the testing project. In an aspect of the present technique, the effort is estimated by dividing the size of the testing project by a predetermined TU Rate. The TU Rate is a unit of productivity which can be expressed in, for example, TU per hour. The approach followed in setting the predetermined TU rate for the testing project is to determine an average productivity of a sample of prior executed testing projects. In some instances completed test projects can be reverse engineered. For this purpose, the size of each testing project from the sample can be measured in TUs by determining the number of application parameters that are present in the application. The effort spent (for example, in hours) for each testing project execution can be recorded. The productivity value of each testing project from the sample can be calculated by dividing the size by actual effort spent. An average of these productivity values can be then calculated to obtain the predetermined TU rate. A similar approach can be followed to set the values of the predetermined TU rate for both TCG and MTE.

EXAMPLE 4

Exemplary Method for Estimating Software Testing Application Size

Software testing determines if a software program runs correctly. To determine if a software program runs correctly, the desired behavior of the software program must first be determined; the software behavior is then tested, and the results are checked against the desired behavior. Software testers can determine desired behavior from a variety of sources, including resources that describe the end behavior of a software system, screen shots, interviews with developers, and so on.

FIG. 1 illustrates an exemplary method 100 for estimating software testing size. At 105, desired software behavior is selected, and resource requirements are identified at 110. When a company is estimating software testing time for software developed outside the company, resource documents that are available prior to commencement of the testing project may be quite vague. Some systems may have detailed and formalized requirements resources, other systems may have only much more general documentation about the system behavior. However, the sum total of the knowledge that can be gleaned about a software program that is to be tested can be thought of as, collectively, the resources requirement 110. The first step of estimating the size and effort required to test a software application comprises identifying the resources requirement 105 that are available. The resource requirements may be derived from a requirements document, use cases, written test cases, and so on, and may be configured for a software test management tool such as, e.g., HP Test Director, and/or configured for a requirements matrix, e.g., in a Requirements Traceability Matrix (RTM) form.

Many testing estimation efforts involve back-of-the-envelope calculations which are not replicable. For example, testing estimates are sometimes calculated by determining the percentage of test cases that are considered simple, medium, or complex. Each category of test cases is then given a time value, e.g., simple cases may be determined to take X hours, medium cases Y hours, and complex cases Z hours. However, it is unclear how to sort test cases into these three categories, and it is also unclear how much time should be associated with each difficulty category. This produces the effect that different organizations, or different people in the same organization may give may different estimates for the same software testing project. As shown in FIG. 1, at 115 process requirement resources are determined to establish numbers of test units estimated. The test units 120 provide a standard, objective method to determine software testing estimation.

Testing units are determined based on the process requirement resources, numbers of activities of various types to be tested in the software application, and different types of parameters. The parameters influence the size of the model, and thus, the testing time. Not all parameters that are counted will be tested, rather the parameters influence the size of the software project, which is directly related to testing time. Different parameter types have, on average, different testing sizes. This difference is captured in a scaling weight (also called the parameter scaling weight), with the results calculated to give an abstract unit called the test unit (TU) 120. The TU 120 is then used as the unit of measurement for the size of testable requirements of the project to calculate at 135 the total amount of effort 140 required to test the software application. The TU 120 is independent of the test cases that may be used to actually test the project and so can be calculated prior to test case generation.

EXAMPLE 5

Exemplary Application Parameter Implementation

Figure 2:
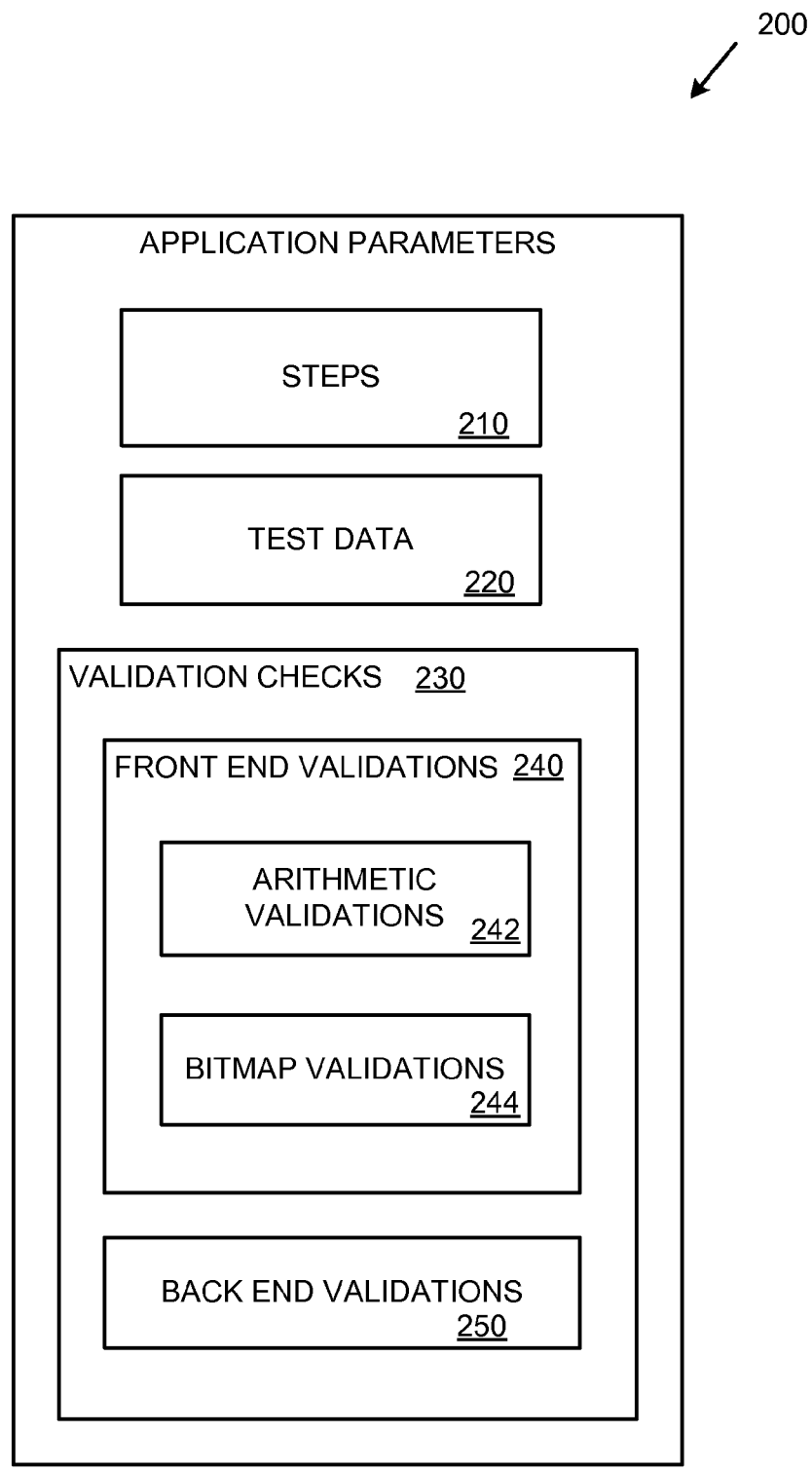
FIG. 2 is a block diagram of an exemplary system showing different application parameters that can be used to determine raw testing units.

FIG. 2 is a block diagram 200 illustrating application parameters used in estimating testing application size. In any of the examples herein, application parameters can comprise any one or more of the application parameters described with reference to FIG. 2. Each of the application testing size embodiments discussed in any of the examples may incorporate one or more of the following FIG. 2 application parameters. These application parameters may be system specific. The application parameters can be identified at a test case level, a scenario level, at the application level, or otherwise identified depending on the amount of detail known, and so forth. Ideally, test parameters are uniformly measurable for the testing project and are independent of perception of an estimator, who estimates the size and effort for the testing project.

Steps 210 are single logical units and typically do not correspond directly to pure navigation steps nor a number of lines of code in a section. Rather, a step may be associated with a unit level activity that causes changes in output. The steps 210 are meant to encompass those results not otherwise accounted for. Examples of single test steps for a GUI application include, for logging in: a step of entering a URL in a browser to reach a login screen, another step of entering a user name, and separate steps of entering a password, clicking the login button, and receiving an error message that an incorrect login was entered, for a total of 5 steps. Once in a GUI application, entering a value in a text box, selecting a value from a list, navigating to a next screen, are also separate steps. For report generation, each external check that a report is valid is considered a step. For example, if there are 20 items on the report that must be checked for accuracy, the report would have 20 steps. However, types of events that will be included as other parameters should not also be included in the step calculations. For example, various types of output changing validations are already counted such as validation checks 230.

To test functionality, applications might need preset information in a database. For example, to test a login screen, a valid user name must be created in a backend database. Test data 220 can include a number of data items that may be needed to be created to test the given software section. If required test data is provided by a client or an outside team, then this data is not included in the calculation. If a number of discrete pieces of test data are required, but they can be generated using a single statement, such as a Structured Query Language (SQL) "Insert" statement, then this can be counted as a single piece of test data. However, if, e.g., 20 fields need to be entered on a separate page for testing purposes, then this can be counted as 20 pieces of test data.

The validation checks 230 are results that are to be verified by the testing process. These can be further broken down into front end validations 240 and back end validations 250.

The front end validations 240 are test results that can be observed by looking at the output on a display device. Front end validations 240 include arithmetic validations 242 and bitmap validations 244.

Arithmetic validations 242 are test validations that require that the software application (or the section of the code being tested) perform an arithmetic calculation, and that the calculation value be verified. These verifications can be performed by a tester using, for example, a calculator.

Bitmap validations 244 are test validations where a specific bitmap is checked for placement and accuracy on a specific screen location. These are more detailed than a step. A step may check that a logo appear on a screen; while a bitmap validation may require that the logo be checked for, e.g., exact placement and exact appearance.

The back end validations 250 are test results that require internal calculations not directly viewable. For example, an action that requires a database lookup (e.g., a database validation) is a back end validation. When testing an ATM system, for example, determining if the correct balance is showing for a test user is a back end validation, as the amount cannot simply be verified by observation, but must instead be checked against a balance value stored in a database.

EXAMPLE 6

Exemplary Back End Validations

Figure 3:
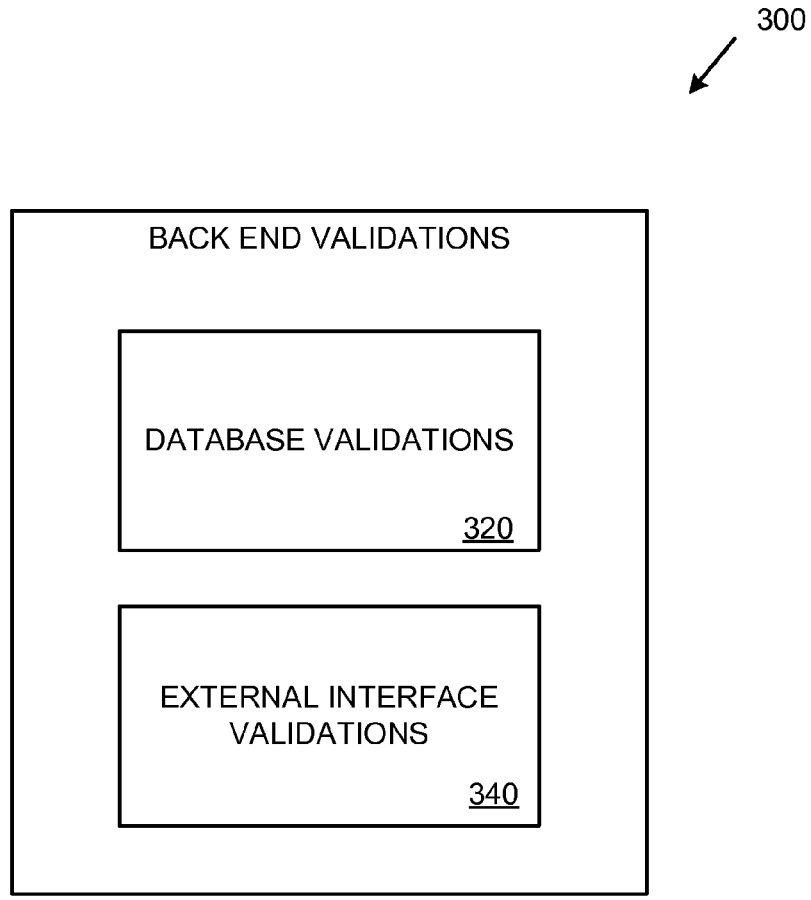
FIG. 3 is a block diagram of an exemplary system showing different back end validations that may be a portion of the application parameters.

FIG. 3 is a block diagram 300 illustrating back end validations used in estimating testing application size. In any of the examples herein, back end validations can comprise any one or more of those described herein. Each of the application testing size embodiments discussed in any of the examples may incorporate one or more of the following back end validations.

Database validations 320 are test validations that require that the software application (or the section of the code being tested) retrieve a value from a database, and that the database value so retrieved be verified.

External interface validations 340 are test validations in which a software program under test interfaces with a third party. For example, a validation may be associated with an application passing a value to a third party application. Another validation can be receiving a value from the third party application. This type of validation is often encountered when a new application passes values to a legacy application.

EXAMPLE 7

Exemplary Parameter Scaling Weights

Figure 4:
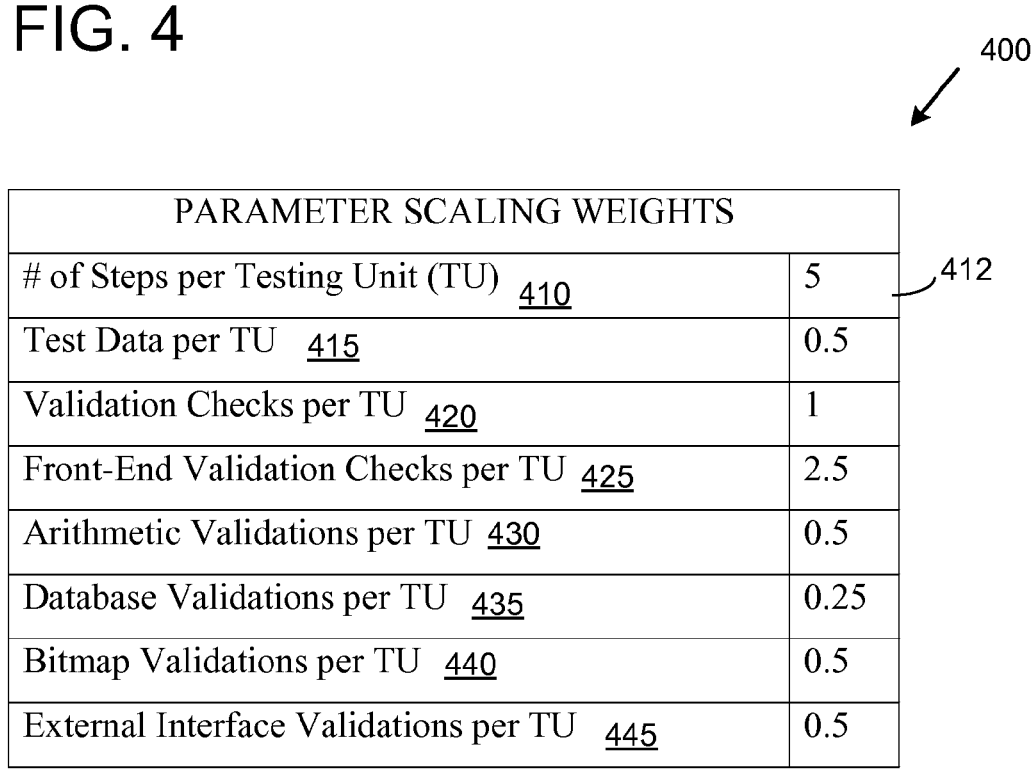
FIG. 4 is a block diagram of an exemplary system showing different parameter scaling weights that may be used to determine raw testing units.

FIG. 4 is a block diagram 400 illustrating representative parameter scaling weights that can be used in estimating testing application size. In any of the examples herein, parameter scaling weights can comprise any one or more of those described herein. Each of the application testing size embodiments discussed in any of the examples may incorporate one or more of the following parameter scaling weights.

One or more of the application parameters may have an associated parameter scaling weight. The different application parameters specify the amount of weight different application parameters are given when determining test units.

The values given are just one set of values from among many possible values. Values may be determined based on historic data for specific companies, data for specific types of application programs, specific languages or programming techniques, a combination thereof, or other data. Each check, step, or validation can be assigned a specific weight. As shown in FIG. 4, values for a plurality of validations 420, 425, 430, 435, 440, 445 are shown. The Testing Unit (TU) may be defined individually in terms of each test parameter. For example, it can be seen from the table 400 that one TU, in the exemplary embodiment, is equal to five test steps or one validation check.

EXAMPLE 8

Exemplary Method to Calculate Estimated Testing Effort

Figure 5:
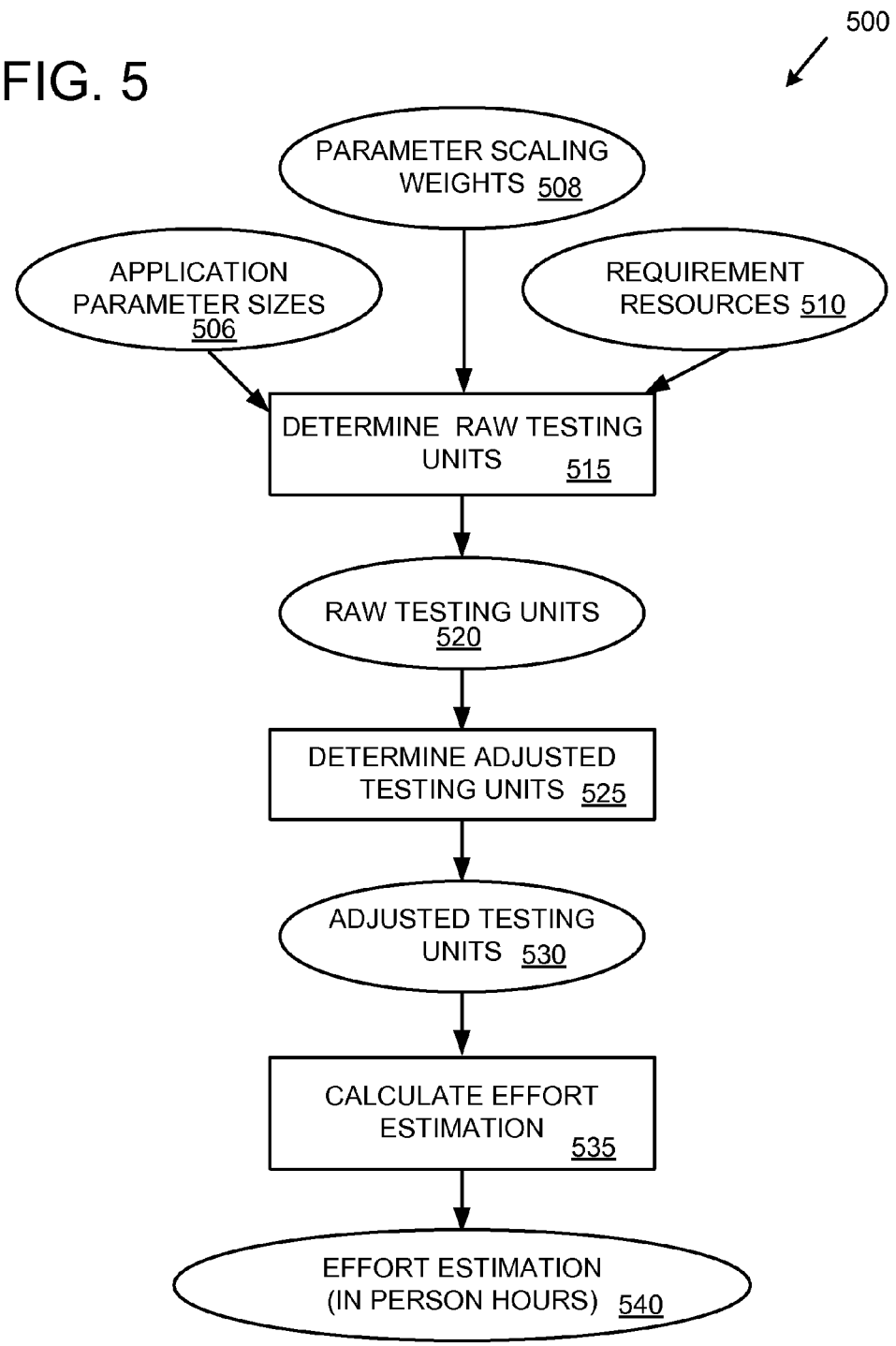
FIG. 5 is a flow chart of an exemplary method to calculate estimated testing effort by determining raw testing units and adjusted testing units.

FIG. 5 is a flow chart of an exemplary method 500 to calculate estimated testing effort by determining raw testing units and adjusted testing units. At 515, using application parameter sizes 506, parameter scaling weights 508, and requirements resources 510, the raw testing units 520 are determined. At 525, using the raw testing units testing units 520, adjusted testing units 530 are determined. At 535, using the adjusted testing units 530, the effort estimation 540 needed for the software project is determined, producing an effort estimation time in man-hours.

EXAMPLE 9

Exemplary Method to Calculate Estimated Testing Effort

Figure 6:
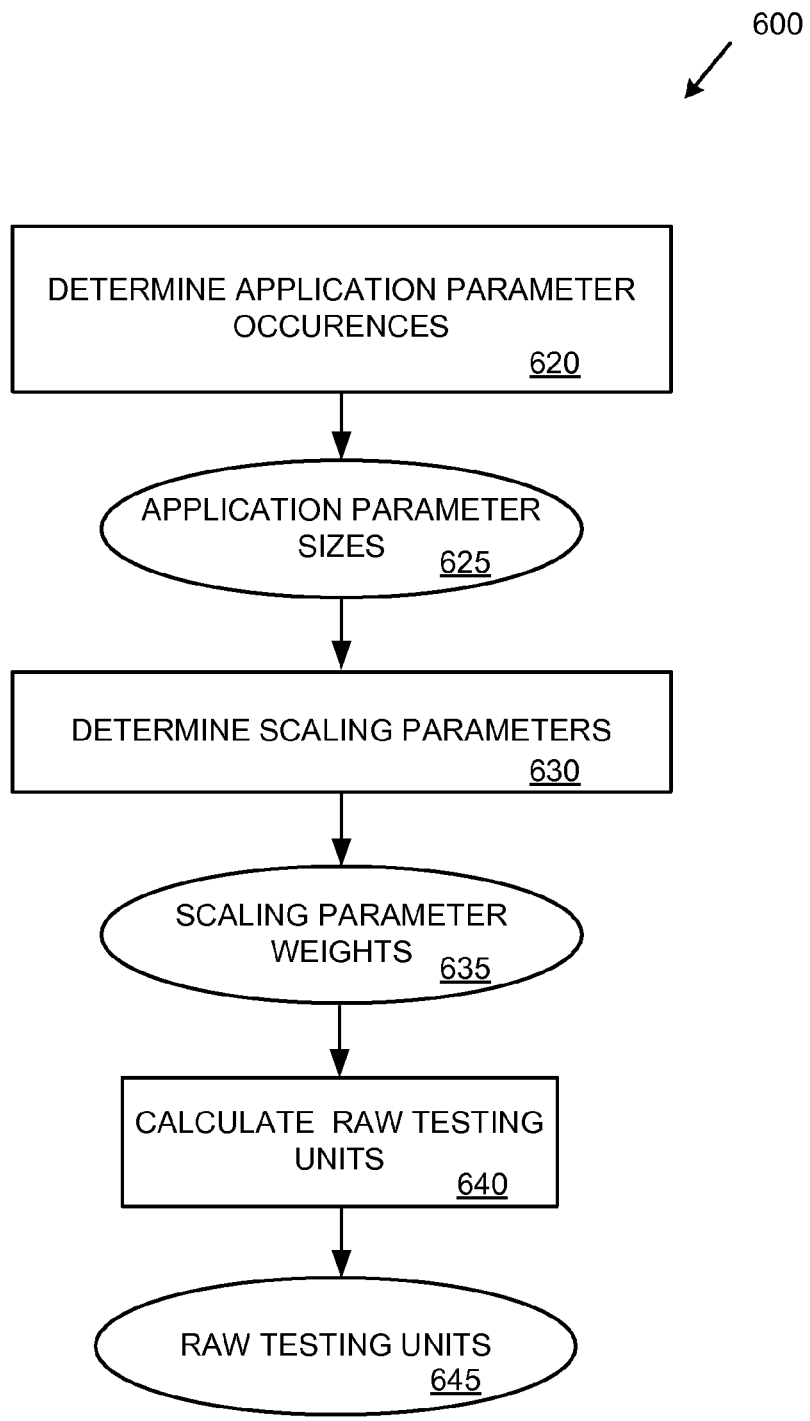
FIG. 6 is a flow chart of an exemplary method that may be used to calculate raw testing units.

FIG. 6 is a flow chart 600 of an exemplary method that may be used to calculate raw testing units. This example also refers to FIGS. 3, 4, and 5.

At 620, application parameter occurrences are determined to produce application parameter sizes 625. Each separate application parameter may have an associated parameter size, i.e., a number of times the parameter occurs in the software code to be tested. These occurrences are determined through, e.g., the requirements documents, other knowledge about the project, and so forth. A number of application parameters that may be used have been presented earlier in FIGS. 2 and 3.

In some embodiments, a subset of those application parameters may be used for a given software application testing project. For example, a project may not include checks for, e.g., bitmap validations. At 630, scaling parameters are determined to produce scaling parameter weights 635. The scaling parameters may be constants that are determined beforehand. The predetermined weights of the scaling parameters may be determined from a sample of prior executed testing projects. For example, the predetermined values in the table of FIG. 4 were determined from prior executed testing projects.

At 640, raw testing units 645 are calculated. In some embodiments, the calculation of raw testing units can be based on a sum (number of steps/step weight)+(amount of test data/test data weight)+(number of front-end validation checks/front-end validation check weight)+(number of arithmetic validations/arithmetic validations weight)+(number of database validations/database validation weight)+(number of bitmap validations/bitmap validation weight)+(number of external interface validations/external interface validation weight). Contributions for each application parameter in the software application under test can be included.

In an example illustrating the measurement of the size of the testing project, test parameters values for the particular test case be written as {x, y, z, . . . } and corresponding predetermined (or other) parameter scaling weights written as {a, b, c, . . . }. Then, the number of test units can be calculated as:

$$No \text{ of } TUs = \frac{x}{a} + \frac{y}{b} + \frac{z}{c}...$$

It should also be understood that the raw testing unit 645 may be calculated for various levels of a software program to be tested. The calculation may be broken down by module, by test unit, and so on.

EXAMPLE 10

Exemplary Parameter Scaling Weight Input Screen

FIG. 7 illustrates a representative input screen 700 that may be used to input parameter scaling weights that may be used to determine raw testing units. A test cases column 720 allows a user to divide the testing calculation into a number of differently-sized portions. Two portions 101, 102 are shown but more test portions can be included and any desired modularity can be used. Testing project time and size may be estimated using embodiments taught herein at many stages. When few facts are known, then just a few modules/test cases may be used for the estimation. As more information is learned, then the granularity, and hence the number of modules/test cases may increase. As shown in FIG. 7, representative values for numbers of steps, numbers of data creation manipulation statements, numbers of front end validations, numbers of arithmetic validations, numbers of validations against a database, and resulting numbers of raw testing units are shown.

EXAMPLE 11

Exemplary Complexity Adjustment Parameters

Figure 8:
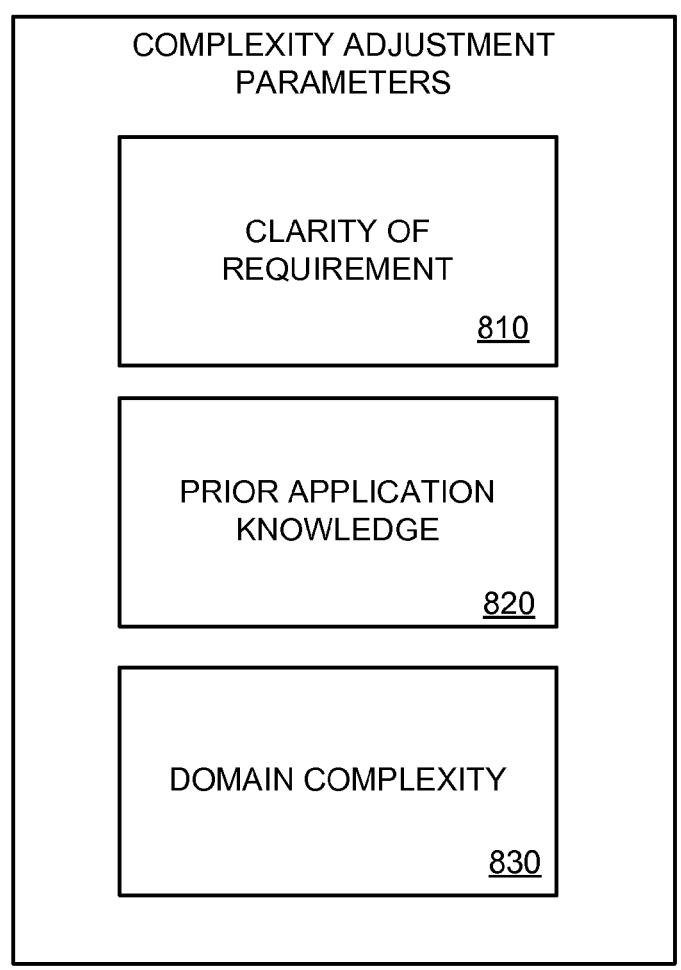
FIG. 8 is a block diagram of complexity adjustment parameters that may be used to calculate adjusted testing units.

FIG. 8 is a block diagram 800 illustrating representative complexity adjustment parameters that may be used to calculate adjusted testing units. Raw testing units can be determined using quantifiable factors as noted above. However, there are other, seemingly more ephemeral or complex parameters that may influence testing time and which can be captured or estimated experimentally. Complexity adjustment parameters experimentally capture at least some of the uncertainty factors that contribute to software application testing time. These complexity adjustment parameters quantitatively account for base knowledge that a testing team has for carrying out the testing project.

In any of the examples herein, complexity adjustment parameters can comprise any one or more of the complexity adjustment parameters described with reference to FIG. 8. Each of the application testing size embodiments discussed in any of the examples may incorporate one or more of the following FIG. 8 complexity adjustment parameters. Some systems may use different complexity adjustment parameters than described here.

In an illustrative embodiment, the complexity adjustment factors add a maximum scaling factor of 30%. Illustrative complexity adjustment factors are described below.

Clarity of requirement 810 describes the amount of information known about the software testing project, e.g., the quality of the information (documents, interviews, etc.) that describes the application to be tested, and the amount of clarification that will be needed from outside sources to develop an accurate software testing plan. In some applications stakeholders are initially unclear about testing project requirements, or the requirements may be unstable.

Prior application knowledge 820 describes an amount of previous test development experience that a testing team and/or people accessible to the testing team possess about this type of application. For example, prior application knowledge might be if the application to be tested is a billing project, and members of the testing team have worked on billing projects previously.

Domain complexity 830 describes an amount of knowledge team members involved in software testing have in the specific domain. A domain is a very high level category and is typically associated with a particular industry such as, for example, telecom, banking, insurance, etc. Significant testing uncertainties can be captured by this variable to reflect testing team experience in the target domain. For example, if a person or a team has previously worked with billing projects in one domain such as telecom, a new billing project in a different domain such as insurance will be associated with increased testing time due to inexperience in the domain.

EXAMPLE 12

Exemplary Complexity Adjustment Factors

FIG. 9 is a block diagram 900 illustrating representative complexity adjustment factors that may be used with complexity adjustment parameters to calculate adjusted testing units. In any of the examples herein, complexity adjustment factors can comprise any one or more of the complexity adjustment factors described with reference to FIG. 9. Each of the application testing size embodiments discussed in any of the examples may incorporate one or more of the following FIG. 9 complexity adjustment factors. Some systems may use different complexity adjustment factors than described herein.

Adjustment factors have values 950 that can be input to account for uncertainty in testing estimation projects. In the illustrative embodiment, each adjustment factor is set to a value between 0 and 2 by a user depending on the amount of uncertainty added to the project by that particular factor, with greater uncertainties being associated with higher values. The values are then correlated with a contribution 960 to a project or subproject to estimate an actual amount of uncertainty added to a testing project. Each contribution is added to a base value of one to produce a weight 970 that can be used to quantify the added uncertainty. The weight 970 is then used to at least partially transform the raw testing units into adjusted testing units.

Representative examples of adjustment factors are shown in FIG. 9 and described below. Other embodiments may use fewer adjustment factors, different adjustment factors, etc. The contribution for specific adjustment factors may also be different and different contributions may be used in the same project for different domains, applications, and so on.

A clarity of requirement factor 920 may be used to further refine a raw testing unit into an adjusted testing unit. The clarity of requirement factor may have different values that can be input by a test estimator. Among the values may be "0" indicating that test cases used to determine the application parameter sizes are clear and detailed. This may be associated with no increase in uncertainty, e.g., a contribution of "0." If test cases require some research, in some embodiments, the value "1" may be input. This may be associated with a contribution (an increase in uncertainty) of 0.05. If test cases require discussions with earlier teams or outside teams that initially developed the software that is being tested then the value "2" may be used. This may be associated with a contribution (an increase in uncertainty) of 0.1. If test cases are not included during software testing estimation, then these factors may need to be adjusted. Other possible values are also envisioned.

A prior application knowledge factor 930 may also be used to further refine the raw testing unit. Possible values can be selected as follows. If the software team/business has experience in this type of application, then the value "0" may be used. This may be associated with no increase in uncertainty, e.g., a contribution of "0." If the software team/business does not have experience in this application area, then the number "1" may be entered. This may be associated with a contribution (an increase in uncertainty) of 0.1.

A domain complexity factor 940 may also be used to even further refine the raw testing unit. Possible values can be selected as follows. If the software team/business has experience in the type of domain (e.g., area of practice such as telecom, insurance, banking, healthcare, etc.) associated with this software testing project, then the value "0" may be used. This may be associated with no increase in uncertainty, e.g., a contribution of "0" If the software team/business does not have experience in this domain, but there are people in the organization that do have such experience, then the value "1" may be entered. This may be associated with a contribution (increase in uncertainty) of 0.05. If the software team does not have access to people with experience in this domain, then the number "2" may be used. This may be associated with a contribution (an increase in uncertainty) of 0.1.

In some embodiments, to determine the weighting factor, the individual contributions are added to the constant value one. For example, if the value of all three complexity adjustment parameters is equal to one, then the value of the weighting factor 970 is calculated to be 1.2 (i.e., 1+0.05+0.1+0.05). The weighting factor 970 may then be multiplied by the number of raw TUs to obtain adjusted testing units.

EXAMPLE 13

Exemplary Adjusted Testing Unit Calculation Method

Figure 10:
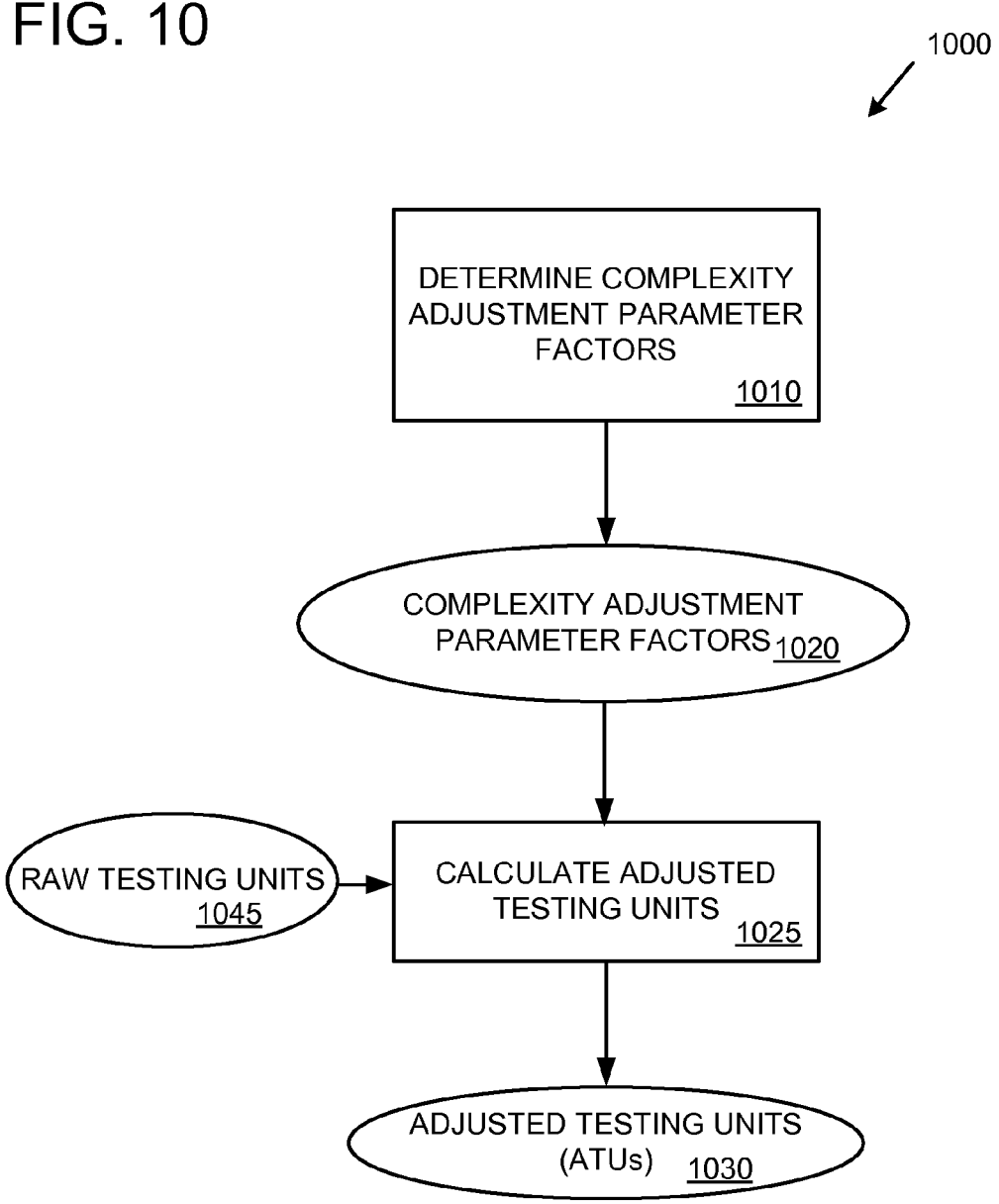
FIG. 10 is a flowchart of an exemplary method that may be used to calculate adjusted testing units.

FIG. 10 is a flowchart 1000 of an exemplary method that may be used to calculate adjusted testing units. At 1010, the complexity adjustment parameter factors 1020, e.g., the factors discussed with reference to FIG. 9, are determined. At 1025, using the raw testing units 1045 (previously calculated) and the complexity adjustment parameter factors 1025, the number of adjusted testing units is calculated, giving adjusted testing units 1030, an abstract unit of size.

EXAMPLE 14

Exemplary Complexity Adjustment Factors

FIG. 11 is a representation of an input screen 1100 that may be used to input adjustment factors that may be used to determine adjusted testing units. In the illustrated embodiment, the test cases column 1120 may be used for any desired modularity. At the chosen modular level, separate complexity adjustment parameters, e.g., some combination of clarity requirement values 1125, prior application knowledge values 1130, and domain complexity values 1135 can be entered. The adjustment factor values 1140 (e.g., a combination of the values entered in the table 1100 and associated contribution factors) is then used to produce a number of adjusted test units 1145. The numbers of adjusted test units 1145 for each of the test cases are then totaled at 1150 to produce a single adjusted testing unit value.

EXAMPLE 15

Exemplary Test Estimate Variables

Figure 12:
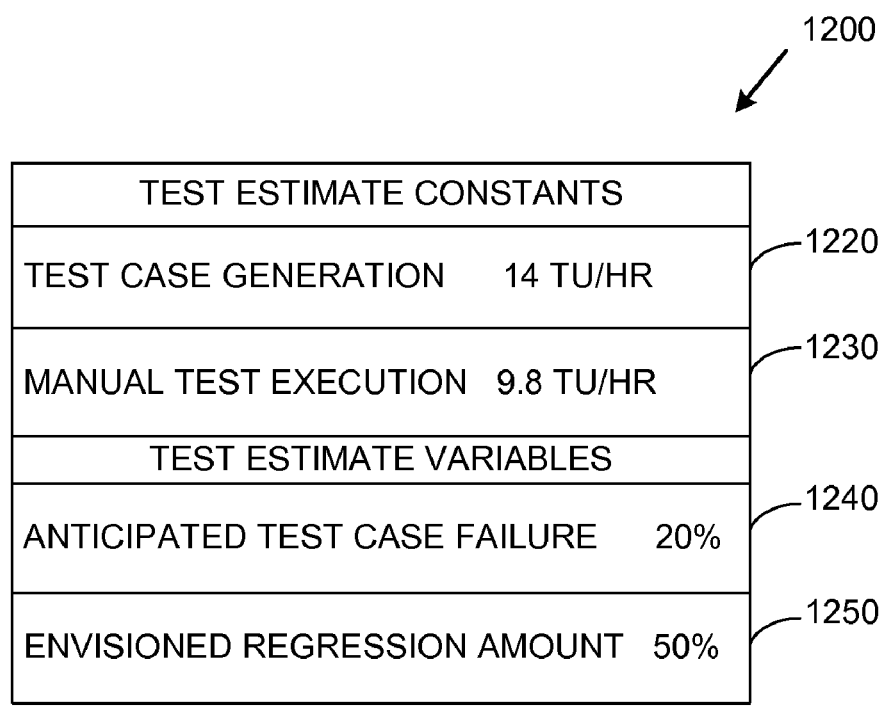
FIG. 12 is a block diagram of test estimate constants and variables that may be used with the adjusted testing units to calculate a total test effort estimation.

FIG. 12 is a block diagram 1200 illustrating test estimate productivity constants and variables that may be used with the adjusted testing units to calculate a total test effort estimation. After a numbers of adjusted test units are determined, in some embodiments, these numbers are divided by a predetermined Testing Unit (TU) rate to estimate the testing effort required to carry out the testing project. In some implementations, the TU rate is expressed in person/hours (TU/HR). In some embodiments, different phases of the test process have different TU/HR associated with them, such that by, e.g., dividing the adjusted test units by the TU/HR associated with the test phase, the software testing estimate for that phase can be determined. In an exemplary embodiment, the Test Case Generation (TCG) phase is assigned a TU/HR value (e.g., 14 TU/HR) as shown at 1220, and the Manual Test Execution (MTE) phase is assigned a separate TU/HR value (e.g., 9.8 TU/HR) as shown at 1230. The adjusted test unit is then divided by the TU/HR value to determine effort (e.g., person-hours.)

In some implementations, time for a subactivity of the MTE, e.g., a "Cycle 1 Retest Effort" is determined using both the MTE value and a user-defined or predefined variable such as an Anticipated Test Case Failure 1240. In some implementations, another subactivity of the MTE, the "manual test execution effort in a regression cycle (cycle 2)" is determined using both the MTE value and a user-defined or predefined variable Envisioned Regression Amount 1250.

EXAMPLE 16

Exemplary Method to Calculate a Total Test Effort Estimation Using TU/HR and Adjusted Testing Units FIG. 13 is a flowchart 1300 of an exemplary method that may be used to calculate a total test effort estimation using TU/hr (the TU rate) and adjusted testing units. At 1310, using historical data 1305, the number of hours to perform a specific testing task (e.g., TCG, MTE) for one testing task is determined. At 1320, using the ATUs 1317 previously determined and test rate in tasks/hr (TU/HR) 1315, the person-hour estimation 1325 for the task is determined. In an exemplary embodiment, ATUs are divided by the TU/HR to arrive at the total testing activity for this task. At 1330, times to perform subactivities associated with a given testing task are estimated as a percentage of the person-hours for the testing tasks. The testing task and subactivities are then summed to determine a total test effort estimation 1335.

EXAMPLE 17

Exemplary Test Effort Estimation Screen

FIG. 14 is representation of an input screen 1400 that may be used to display test effort estimation results, and may be used to calculate subactivity effort amounts as percentages of test efforts previously calculated using systems and methods as taught herein.

Requirements analysis 1405 is a process that is generally required or completed prior to performing testing estimation. Therefore, at the time of the estimation it is a known value, and is not otherwise included in the model.

The Test Case Generation (TCG) line 1410 displays a test effort estimation value in person/hours (e.g., 28) that is determined using methods described herein, and in embodiments is displayed as a final value on this screen.

The subcategories RTM Preparation 1415, RTM Review and Rework 1420, Test Case Review 1425, Test Case Rework 1430, Test Environment Setup 1435, and Test Data Setup 1440 may all be determined as percentages of the estimated TCG hours.

A Manual Test Execution line 1445 displays a test effort estimation value in person/hours (e.g., 41) that is determined using methods described herein, and, in embodiments, is displayed as a final value on this screen.

Subactivities of the MTE may also be calculated as a percentage of the MTE test effort estimation value. Cycle 1 Retest Effort 1450 may be calculated by determining the percentage of anticipated test case failures; those test cases that fail may require retesting after they are presumably, fixed. Thus, if a 20% test case failure rate is assumed, the Cycle 1 retest effort would be 20% of the MTE value. In some embodiments, the Anticipated Test Case Failure percentage (e.g., 1240 of FIG. 12) is input as a value. The specific value may depend on the perceived stability of a testing application. If a thoroughly tested application has a minor amount of new functionality being tested, this value would most likely be lower than if an application was new and was being tested from scratch.

MTE effort in Cycle 2 Regression Testing 1455 may also be calculated as a percentage of the MTE test effort estimation value. Regression testing is done to ensure that fixes incorporated during testing did not break any existing functionality. This may be calculated as the percentage of test cases that will need regression analysis. Thus, if a 75% regression analysis rate is assumed, the Cycle 2 testing effort would be 75% of the MTE value. In some embodiments, the Envisioned Regression Amount (e.g., 1250 of FIG. 12) is input as a percent value by a user, in other instances a value is hard-coded. The value may then be multiplied by the MTE value to determine the MTE Effort. The specific value used here may depend on the perceived stability of a testing application. If a thoroughly tested application has a minor amount of new functionality being tested, less regression analysis would most likely be performed than if an application was new and was being tested from scratch.

Other subactivities, e.g., Test Result Analysis 1460, and Test Result Reporting 1465 may also be estimated as a percentage of the MTE value. Other values, such as project management activity may be calculated as a percent of the total testing effort, e.g., the summation of the MTE and TCG values and the various subactivities 1480. The sum of all the values may be recorded as the total testing effort 1485. Different embodiments only include calculations for the TCG 1410 and/or MTE 1445. Other embodiments have different subactivites included, such as the Cycle 1 Test Effort 1450 and the Manual Test Regression Effort in Cycle 2 1455. Such embodiments may sum all four calculated values (e.g., 1410, 1445, 1450, and 1455) in a Total Effort TCG/MTE field 1470. Some embodiments do not calculate the subactivity amounts.

EXAMPLE 18

Exemplary Computing Device

Figure 15:
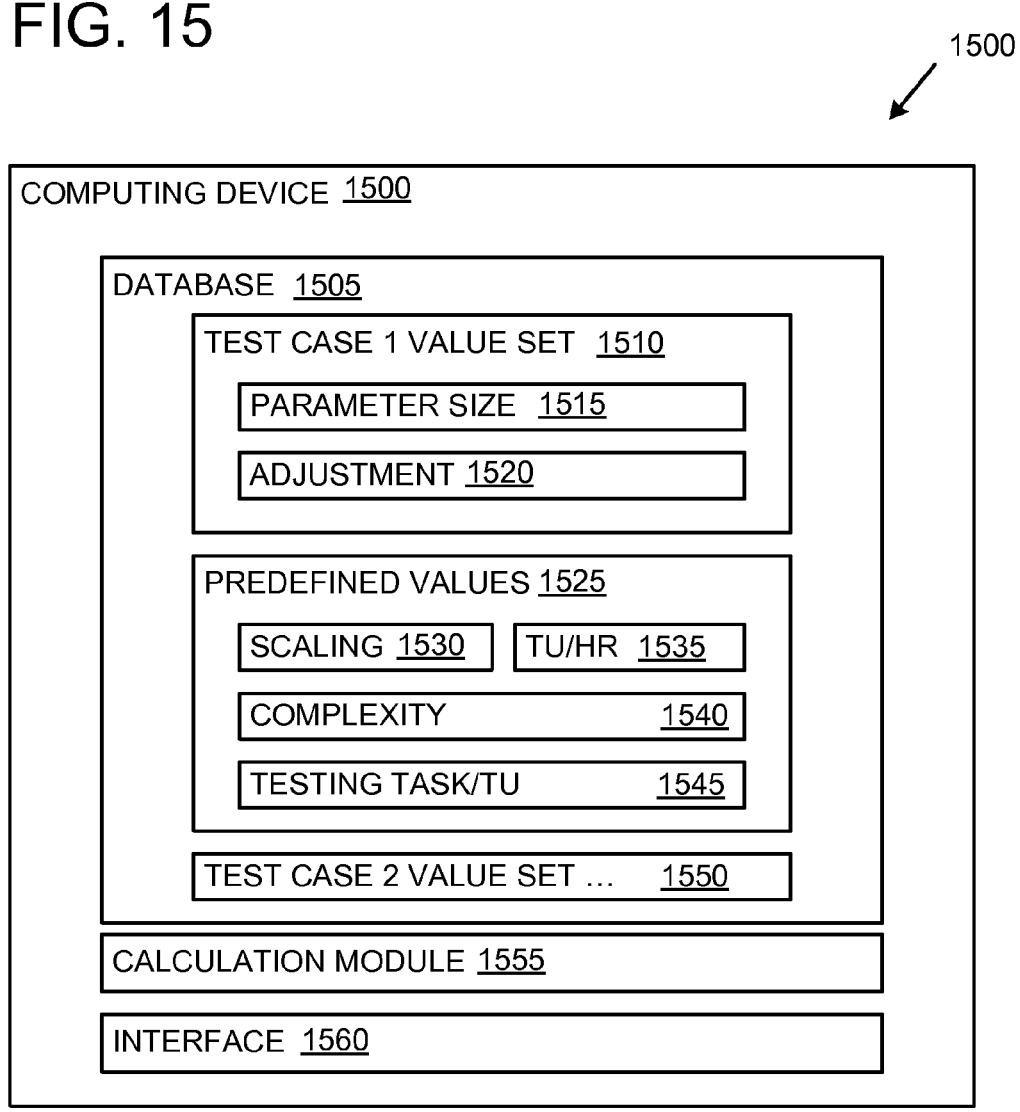
FIG. 15 is a block diagram of a computing device that may be used to estimate size when testing a software application.

FIG. 15 is a block diagram of a computing device 1500 that may be used to estimate the amount of time a software application testing project will take. A computing device 1500 comprises a database 1505, a calculation module 1555 and an interface 1560. One or more test case value sets 1510, 1550 may also be included in the database 1505. The test cases value sets 1510, 1550 may include the number of occurrences of each of a set of application parameters, e.g., parameter size 1515, that occur in the test cases. The test case values may also include complexity adjustment parameter values 1520 used by the calculation module to calculate an uncertainty buffer for the time estimation.

The database 1500 may also include predefined values, such as parameter scaling weights 1530, used in conjunction with the parameter sizes to establish raw testing units. Complexity adjustment contributions 1540, used in connection with test case complexity adjustment parameter values 1520 may also be included. The test case complexity adjustment contributions and the complexity contributions are multiplied for each test case and then the test case values are summed together to give adjusted testing units. The database may also include TU/hr 1535 values used to transform adjusted testing units into person-hours required for testing. Specific testing tasks may have their own TU/hr values 1545.

EXAMPLE 19

Exemplary Computing Environment

Figure 16:
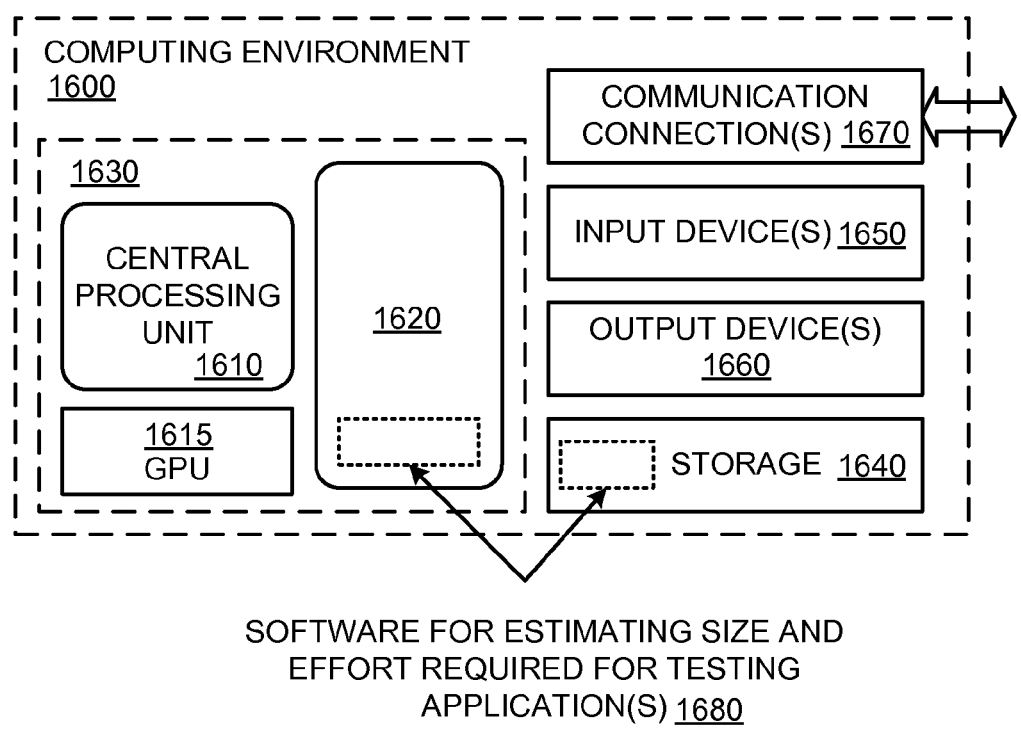
FIG. 16 is a block diagram illustrating an exemplary computing environment for implementing software test effort estimation as taught herein.

FIG. 16 and the following discussion are intended to provide a brief, general description of an exemplary computing environment in which the disclosed technology may be implemented. The disclosed technology may be implemented with other computer system configurations, including handheld devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 16 illustrates a generalized example of a suitable computing environment 1600 in which described embodiments may be implemented. The computing environment 1600 is not intended to suggest any limitation as to scope of use or functionality of the technology, as the present technology may be implemented in diverse general-purpose or special-purpose computing environments.

With reference to FIG. 16, the computing environment 1600 includes at least one central processing unit 1610 and memory 1620. In FIG. 16, this most basic configuration 1630 is included within a dashed line. The central processing unit 1610 executes computer-executable instructions and may be a real or a virtual processor. In a multi-processing system, multiple processing units execute computer-executable instructions to increase processing power and as such, multiple processors can be running simultaneously. The computing environment 1600 may also include a graphics processing unit (GPU) 1615, which assists in creating or speeding up graphics processing and display. Memory 1620 may be volatile memory (e.g., registers, cache, RAM), non-volatile memory (e.g., ROM, EEPROM, flash memory, etc.), or some combination of the two. The memory 1620 stores software 1680 implementing the described methods for estimating size and effort in testing applications. A computing environment may have additional features. For example, the computing environment 1600 includes storage 1640, one or more input devices 1650, one or more output devices 1660, and one or more communication connections 1670. An interconnection mechanism (not shown) such as a bus, a controller, or a network, interconnects the components of the computing environment 1600. Typically, operating system software (not shown) provides an operating environment for other software executing in the computing environment 1600, and coordinates activities of the components of the computing environment 1600.

The storage 1640 may be removable or non-removable, and includes magnetic disks, magnetic tapes or cassettes, CD-ROMs, CD-RWs, DVDs, High-definition DVDs, HD-DVD's, Blu-ray format optical disks, or any other medium which can be used to store information and which can be accessed within the computing environment 1600. The storage 1640 stores instructions for the software 1680 implementing methods estimating size and effort in testing applications.

The input device(s) 1650 may be a touch input device, such as a keyboard, mouse, pen, or trackball, a voice input device, a scanning device, or another device, that provides input to the computing environment 1600. For audio, the input device(s) 1650 may be a sound card or similar device that provides audio and/or video samples to the computing environment 1600. The output device(s) 1660 may be one or more of a display, printer, speaker, video screen, CD-writer, or another device that provides output from the computing environment 1600.

The communication connection(s) 1670 enable communication over a communication medium to another computing entity. The communication medium conveys information such as computer-executable instructions, compressed graphics information, or other data in a modulated data signal.

Computer-readable media are any available media that can be accessed within a computing environment 1600. By way of example, and not limitation, with the computing environment 1600, computer-readable media include memory 1620, storage 1640, communication media (not shown), and combinations of any of the above.

EXAMPLE 20

Methods in Computer-Readable Media

Any of the methods described herein can be performed via one or more computer-readable media (e.g., storage media) having computer-executable instructions for performing such methods.

EXAMPLE 21

Exemplary Alternatives

The technologies of any example described herein can be combined with the technologies of any one or more other examples described herein.

In view of the many possible embodiments to which the principles of the disclosed technology may be applied, it should be recognized that the illustrated embodiments are only examples of the technology and should not be taken as limiting the scope of the following claims. We, therefore, claim as our invention all that comes within the scope and spirit of these claims.

We claim:

1. A computer-enabled method of estimating testing effort in a testing project comprising:
    storing, in a database, requirements for the testing project;
    calculating raw testing units using the requirements for the testing project and predetermined parameter scaling weights;
    storing, in the database, complexity adjustment weights for the testing project;
    wherein the complexity adjustment weights for the testing project comprise a clarity of requirement weight for a clarity of requirement factor that describes an amount of information known about the testing project;
    using the raw testing units and the complexity adjustment weights, determining adjusted testing units;
    determining a value of an anticipated test case failure percentage variable; and
    using the adjusted testing units the value of the anticipated test case failure percentage variable, and predetermined test generation weights to determine estimated testing effort for the testing project.

2. The computer-enabled method of claim 1 wherein determining requirements for the testing project further comprise
    storing, in the database, test cases developed from the requirements for the testing project; and
    storing, in the database, application parameters for the test cases.

3. The computer-enabled method of claim 2 wherein the application parameters comprise numbers of steps and numbers of validations for the test cases.

4. The computer-enabled method of claim 3 wherein the numbers of validations comprise numbers of validation checks, numbers of front-end validations, and numbers of back-end validations.

5. The computer-enabled method of claim 4 wherein numbers of back-end validations comprises numbers of database validations, and numbers of external interface validations.

6. The computer-enabled method of claim 1 wherein the complexity adjustment weights for the testing project further comprise a prior application knowledge weight and a domain complexity weight.

7. The computer-enabled method of claim 1 further comprising a predetermined test unit hour.

8. The computer-enabled method of claim 7 wherein the predetermined test unit hour is established by determining average hourly productivity of one or more completed testing projects.

9. The computer-enabled method of claim 7 wherein using the adjusted testing units and predetermined test generation weights to determine the estimated testing effort for the testing project further comprises calculating the estimated testing effort, the calculation using the test unit hour, the adjusted testing units and predetermined test task weights, wherein the predetermined test task weights comprise testing units per task.

10. The computer-enabled method of claim 9 wherein the predetermined test task weights comprise a test case generation weight, wherein the estimated testing effort comprises test case generation effort and wherein using the adjusted testing units and predetermined test generation weights to determine estimated testing effort for the testing project comprises calculating test case generation effort using the testing units per task, the test case generation weight and the adjusted testing units.

11. The computer-enabled method of claim 9 further comprising:
    calculating test generation subactivities using a predetermined percentage of a test generation effort and an anticipated test case regression percentage variable.

12. The computer-enabled method of claim 9 wherein the predetermined test task weights comprise manual test execution weight, wherein the estimated testing effort comprises a manual test execution effort and wherein using the adjusted testing units and predetermined test generation weights to determine estimated testing effort for the testing project comprises calculating a test case generation effort using the testing units per task, the manual test execution weight and the adjusted testing units.

13. The computer-enabled method of claim 12 further comprising:
    determining an anticipated test case regression percentage variable; and
    calculating test generation subactivities using predetermined percentages of the test case generation effort and an anticipated test case regression percentage variable.

14. The computer-enabled method of claim 12 further comprising calculating test generation subactivities using predetermined percentages of a test generation effort, and wherein the test generation subactivities comprise test result analysis and test result reporting.

15. The computer-enabled method of claim 7 further comprising estimating subactivity efforts as a percentage of the estimated testing effort and further comprising estimating a total test effort as a summation of the subactivity efforts and the estimated testing effort.

16. At least one computer-readable storage data carrying medium encoded with computer-executable instructions comprising software program code that when executed cause a computing device to perform a method, the method comprising:
    storing, in a database, requirements for a testing project;
    producing application parameter sizes for application parameters, wherein producing application parameter sizes comprises:
        determining occurrences of a respective application parameter of the application parameters, wherein the respective application parameter comprises a bitmap validation;
    calculating a number of raw testing units using the application parameter sizes for the application parameters, the requirements for the testing project, and predetermined parameter scaling weights, wherein the respective application parameter is assigned a respective predetermined parameter scaling weight of the predetermined parameter scaling weights;

storing, in the database, complexity adjustment weights for the testing project;

wherein the complexity adjustment weights for the testing project comprise a clarity of requirement weight for a clarity of requirement factor that describes an amount of information known about the testing project;

using the number of raw testing units and the complexity adjustment weights, determining a number of adjusted testing units;

determining a value of an anticipated test case failure percentage variable; and using the number of adjusted testing units and the value of the anticipated test case failure percentage variable to determine estimated testing effort for the testing project, wherein using the number of adjusted testing units to determine the estimated testing effort for the testing project further comprises:

dividing the number of adjusted testing units by a predetermined test unit rate, wherein the predetermined test unit rate is set by determining an average productivity of a sample of prior executed testing projects.

* * * * *

UNITED STATES PATENT AND TRADEMARK OFFICE
CERTIFICATE OF CORRECTION

Page 1 of 1

PATENT NO. : 8,375,364 B2
APPLICATION NO. : 11/871093
DATED : February 12, 2013
INVENTOR(S) : Udupa et al.

It is certified that error appears in the above-identified patent and that said Letters Patent is hereby corrected as shown below:

In the Claims:

Column 15, line 42, Claim 1, "units the" should read -- units, the --.

Signed and Sealed this
Twenty-seventh Day of October, 2015

Michelle K. Lee
*Director of the United States Patent and Trademark Office*